(12) United States Patent
Da Silva

(10) Patent No.: US 7,607,337 B2
(45) Date of Patent: Oct. 27, 2009

(54) TWO-WAY LINEAR/DYNAMIC FORCE MULTIPLYING DEVICE

(76) Inventor: Serafim Félix Da Silva, Rua Professora Branca Leite, 160, Brasiliana (BR) 57310-030

( * ) Notice: Subject to any disclaimer, the term of this patent is extended or adjusted under 35 U.S.C. 154(b) by 26 days.

(21) Appl. No.: 12/066,156

(22) PCT Filed: Sep. 21, 2006

(86) PCT No.: PCT/BR2006/000191

§ 371 (c)(1),
(2), (4) Date: Mar. 7, 2008

(87) PCT Pub. No.: WO2007/033451

PCT Pub. Date: Mar. 29, 2007

(65) Prior Publication Data

US 2008/0264145 A1  Oct. 30, 2008

(30) Foreign Application Priority Data

Sep. 22, 2005  (BR) .................................. 05040162

(51) Int. Cl.
G01M 19/00 (2006.01)
(52) U.S. Cl. ...................................... 73/11.01
(58) Field of Classification Search ................ 73/11.01, 73/764, 782
See application file for complete search history.

(56) References Cited

U.S. PATENT DOCUMENTS

| 2,506,607 | A | * | 5/1950 | McKendry | 73/11.01 |
| 2,850,902 | A | * | 9/1958 | Staub, Jr. | 73/865.9 |
| 4,236,605 | A | * | 12/1980 | Lindbergh | 187/405 |
| 4,437,675 | A | * | 3/1984 | Koenig, III | 279/130 |
| 2008/0230322 | A1 | * | 9/2008 | Chung | 187/250 |

FOREIGN PATENT DOCUMENTS

| CN | 1570596 A | 1/2005 |
| SU | 1508131 A1 | 9/1989 |
| SU | 1672292 A1 | 8/1991 |

* cited by examiner

Primary Examiner—Lisa M Caputo
Assistant Examiner—Octavia Davis
(74) Attorney, Agent, or Firm—Richard M. Goldberg

(57) ABSTRACT

That uses the weight of an electric car (1) that runs along a lopsided lever (2), that is, a lever that is larger one side than on the other, with a chain (3) fastened to the smaller side, to transfer the force generated by the weight of the car (1) when it is at the end of the larger side of the lever (2) to a main shaft (5) that moves clockwise and, in turn, moves a return counterweight (8) linearly.

4 Claims, 1 Drawing Sheet

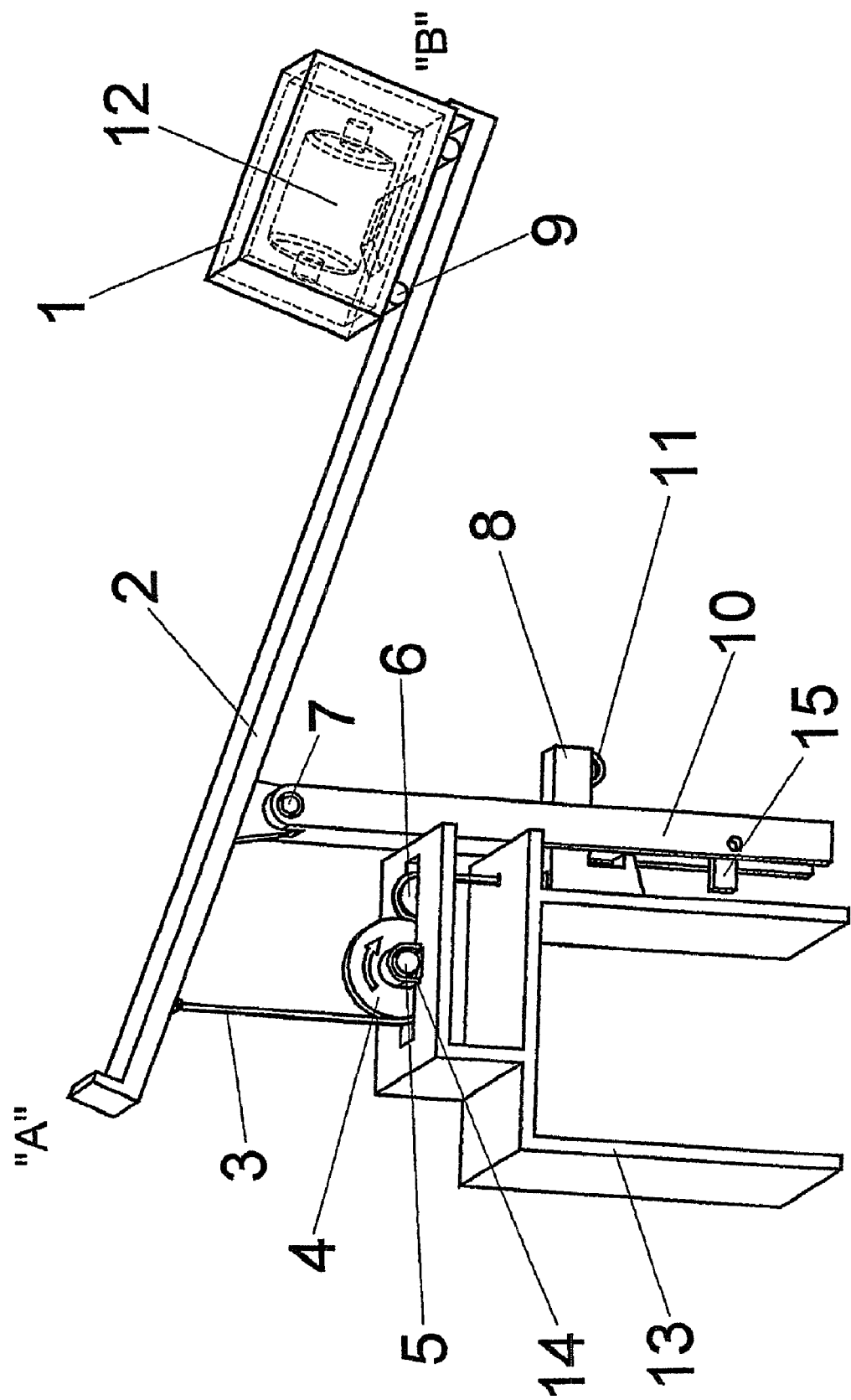

TWO-WAY LINEAR/DYNAMIC FORCE MULTIPLYING DEVICE

BACKGROUND OF THE INVENTION

This invention is a device for two-way multiplication of force, from linear to dynamic and visa-versa, to be used for moving industrial equipment or in any other application requiring one or two simultaneous movements of dynamic and linear force. The subject matter of this application uses the force of a lever and its counterweight, the power of which can be adjusted by varying its size. Furthermore, the device can be manufactured with one or more stages, according to the needs of the application.

Considering that the invention in question is a device that uses the force multiplication capability of a lever together with a counterweight that moves linearly along its surface, we know of no reference to other devices or equipment using this technology.

SUMMARY OF THE INVENTION

This equipment uses the weight of an electric car that runs along a lopsided lever, that is, a lever that is larger one side than on the other, with a chain fastened to the smaller side, to transfer the force generated by the weight of the car when it is at the end of the larger side of the lever to a main shaft that moves clockwise and, in turn, moves a return counterweight linearly.

BRIEF DESCRIPTION OF THE DRAWINGS

The drawing that accompanies this description shows the operation of a single-stage device, but evidently any number of stages can be added.

DETAILED DESCRIPTION

As shown in the drawing that accompanies and is part of this specification, the device operates as follows:

When the counterweight car (1) is at side "B" as shown in FIG. 1/1, it is driven by the motor (12) and runs to the smaller side "A", causing the main lever (2) to go down and lowering the return counterweight (8) to the bottom latch (15). At this moment, the return movement of the counterweight car (1) makes the chain (3) turn the ratchet (4) and when the counterweight car (1) is driven by the motor (12) and goes back the larger side "B", the return counterweight (8) disengages from the latch (15), thereby producing two simultaneous (dual) movements, both multiplied by the main lever (2). The purpose of the latch (15) is to impede the movement of the return counterweight (8) until the counterweight car (1) reaches the appropriate position on side "B" of the lever (2) so that it generates greater force. The first dynamic movement is made when the chain (3) drives the ratchet (4), causing the main shaft (5) to turn clockwise. The second linear movement is made by the return counterweight (8) when it runs linearly from the its lower position to its upper position. This linear movement is useful as a means of transporting, pulling, lifting or otherwise linearly moving objects fastened to the fastening link (11).

The chain (3) is connected with the smaller side "A" of the lever (2) and is wrapped or extends around ratchet (4) and around adjacent pulley (6), with the opposite end of chain (3) connected with return counterweight (8). The main shaft (5) is rotatably mounted by a U-shaped hold-down member (14) mounted on the table support (13), and ratchet (4) is mounted to main shaft (5) for rotation therewith. The lever (2) is mounted by main bearing or pivot pin (7) at the upper end of a further support (10). The car (1) includes wheels (9) for permitting the car (1) to ride along the upper surface of lever (2) and a motor (12) for driving car (12), with the transmission connection between motor (12) and wheels (9) being well known.

In conclusion, the movement of the main lever (2) attached to the main bearing (7), moving upward and downward simultaneously with the movement of the counterweight car (1) from point "A" to point "B" and visa-versa, makes the dynamic movement shaft (5) turn alternately at every ascent and descent of the main lever (2) and causes the linear movement of the return counterweight (8) behave likewise. For the dynamic movement of the main shaft (5) to be continuous, additional stages would be required, which would make the turning movement of the shaft continuous while the linear movement of the return counterweight (8) would always be alternately upward and downward. These movements can be used for different tasks, depending on the application, and will be very valuable for field of mechanics, for fatigue strength testing at any frequency and for testing equipment and springs.

The invention claimed is:

1. A two-way linear/dynamic force Multiplying device, comprising:
    a support,
    a lever having two opposite ends and pivoted at a point intermediate said two opposite ends on said support,
    a counterweight car movable along said lever, said counterweight car having an electrical motor for driving said counterweight car along said lever,
    a return counterweight movable between a raised position and a lowered position,
    a latch for releasably latching said return counterweight at said lowered position,
    a ratchet rotatably mounted to said support by a main shaft,
    a pulley rotatably mounted on said support adjacent said ratchet, and
    a chain having one end connected with one end of said lever and extending around said ratchet and said pulley and having an opposite end connected with said return counterweight.

2. A two-way linear/dynamic force multiplying device according to claim 1, wherein a linear force of the car running along the lever is multiplied and transformed into a dynamic force through the main shaft.

3. A two-way linear/dynamic force multiplying device according to claim 2, wherein the dynamic force is multiplied and transformed into a linear force.

4. A two-way linear/dynamic force multiplying device according to claim 1, wherein the latch releases the return counterweight at a pre-timed moment.

* * * * *